(12) United States Patent
Kumar

(10) Patent No.: US 7,729,359 B1
(45) Date of Patent: Jun. 1, 2010

(54) METHODS AND SYSTEMS FOR PROVIDING ADDRESS TRANSPARENCY

(76) Inventor: Manu Kumar, 837 Garland Dr., Palo Alto, CA (US) 94303-3606

( * ) Notice: Subject to any disclaimer, the term of this patent is extended or adjusted under 35 U.S.C. 154(b) by 526 days.

(21) Appl. No.: 11/377,005

(22) Filed: Mar. 15, 2006

(51) Int. Cl.
*H04L 12/28* (2006.01)
*H04L 12/56* (2006.01)

(52) U.S. Cl. .................. 370/399; 370/389; 370/392

(58) Field of Classification Search ............ 370/389, 370/392, 399, 313; 709/245, 238, 220
See application file for complete search history.

(56) References Cited

U.S. PATENT DOCUMENTS

| | | | |
|---|---|---|---|
| 2002/0112014 A1* | 8/2002 | Bennett et al. | 709/206 |
| 2004/0083184 A1 | 4/2004 | Tsuei et al. | |
| 2004/0167988 A1* | 8/2004 | Rune et al. | 709/238 |
| 2004/0228331 A1* | 11/2004 | Hansen et al. | 370/352 |
| 2005/0078620 A1* | 4/2005 | Balachandran et al. | 370/313 |
| 2005/0177437 A1* | 8/2005 | Ferrier | 705/26 |
| 2005/0204060 A1* | 9/2005 | Maekawa et al. | 709/245 |
| 2006/0212549 A1* | 9/2006 | Hokkyo et al. | 709/220 |
| 2006/0218252 A1* | 9/2006 | Ford | 709/220 |
| 2006/0218296 A1* | 9/2006 | Sumner | 709/238 |
| 2007/0027964 A1* | 2/2007 | Herrod et al. | 709/220 |
| 2007/0094361 A1* | 4/2007 | Hoynowski et al. | 709/220 |
| 2007/0094475 A1* | 4/2007 | Bridges et al. | 711/207 |
| 2008/0028081 A1* | 1/2008 | Bruss | 709/228 |

OTHER PUBLICATIONS

"Take your mailbox with you!" United States Postal Service, Publication 615, Aug. 2005 (1 page).
"Postal Service 'Premium Forwarding Service' Now Available," United States Postal Service, Postal News, Aug. 8, 2005 (2 pages).
"Postnet—Wikipedia, the free encyclopedia," http://en.wikipedia.org/wiki/POSTNET, Mar. 3, 2006 (2 pages).
"Barcode—Wikipedia, the free encyclopedia," http://en.wikipedia.org/wiki/Barcode, Mar. 7, 2006 (6 pages).
"Designing Letter and Reply Mail," United States Postal Service, Publication 25, http://pe.usps.gov/cpim/ftp/pubs/Pub25/pub25.pdf, Jul. 2003 (141 pages).

* cited by examiner

*Primary Examiner*—Pankaj Kumar
*Assistant Examiner*—Lonnie Sweet
(74) *Attorney, Agent, or Firm*—Haynes and Boone, LLP

(57) ABSTRACT

Improved methods and systems are provided to facilitate delivery services between a sending party and a receiving party while permitting a physical location of the receiving party to remain transparent to the sending party. For example, a system as disclosed herein can permit the receiving party to take delivery of mail, packages, or other articles through the use of a virtual address defined by the receiving party without requiring the receiving party to disclose its physical address to the sending party. In another example, articles may be routed to a temporary physical address of the receiving party through the use of a temporary forwarding path also defined by the receiving party.

31 Claims, 8 Drawing Sheets

400

Virtual Address Mapping Setup:

My Virtual Address:
- Name: John Smith
- Address: 5000 Fifth Ave
- City/State/Zip: NY 10001-1000
- Country: USA

178

Deliver To →

My Real Address:
- Name: John Doe
- Address: 123 Main Street, Apt #4
- Palo Alto, CA 94303-3606
- U.S.A.

172

Submit — 402

404

Instructions:

In order to create your virtual address:
1) Select the recipient name that you wisht o use for your virtual address and enter it in the Name field of the My Virtual Address Box.
2) Select a virtual street number and street name and enter it in the first line of the Address field of the My Virtual Address Box. The system will immediately give you feedback on whether the address you have chosen is available or already in use. If the chosen address is not available, please enter a different address.
3) The virtual address city is not customizable and must be set to Virtual City.
4) Select the state you would like to use for your virtual address. You will be given a limited number of zip codes to chose from depending on the state you chose.
5) The country field currently limited to U.S.A. This will change in future as the virtual address service becomes available in other countries.

Set your real address:
1) Enter your real name and your real address for delivery in the My Real Address Box.

Set virtual address mapping...

Fig. 4

Temporary Forwarding Path Setup:

My Virtual Address
- Name: John Smith
- Address: 5000 Fifth Ave
- VirtualCity NY 10001-1000
- USA

*Temporarily Deliver To* →

My Temporary Address:
- Name: John Doe
- Address: 456 Oak St
- Los Angeles, CA 92000-1111
- U.S.A.
- Start Date: 01/15/2006
- Stop Date: 02/15/2006

*In case of failure deliver to* ↓

My Real Address:
- Name: John Doe
- Address: 123 Main Street, Apt #4
- Palo Alto, CA 94303-3606
- U.S.A.

Instructions:
In order to set your temporary mail delivery address:
1) Enter your temporary mailing address in the My Temporary Address box.
2) Set the start date for the temporary address to be effective
3) Set the stop date for the temporary address to use usd
4) Verify your real address which will be used as a fallback in case delivery to the temporary address fails (to account for delays in mail propogation)

[Submit]

Set temporary address mapping...

Lookup Permissions Setup:

Mail Carriers

| | | |
|---|---|---|
| United States Postal Service | ⊙ Allow | ⊙ Deny |
| Federal Express | ⊙ Allow | ⊙ Deny |
| United Parcel Service | ⊙ Allow | ⊙ Deny |
| DHL | ⊙ Allow | ⊙ Deny |

130

Law Enforcement

| | |
|---|---|
| Local Police | ⊙ Allow |
| FBI/CIA/NSA | ⊙ Allow |

150

Other   [Add Provider]

| | | |
|---|---|---|
| Triangle Messenger Service | ⊙ Allow | ⊙ Deny |
| Square Trucking Service | ⊙ Allow | ⊙ Deny |

186

602 — [Submit]

Set temporary address mapping...

Fig. 6

Audit Trail Information:

| Provider Name | Provider Type | Query For | Timestamp |
|---|---|---|---|
| USPS | Mail Carrier | John Smith (321...) | Jan 1, 2006, 9:37 AM |
| USPS | Mail Carrier | John Smith (500...) | Jan 1, 2006, 9:37 AM |
| FedEx | Mail/Package | John Smith (321...) | Jan 2, 2006, 11:53 AM |
| UPS | Mail/Package | John Smith (321...) | Jan 2, 2006, 4:55 PM |
| Local Police | Law Enforcement | John Smith (500...) | Jan 3, 2006 10:20 PM |
| DMV | State Government | John Smith (321...) | Jan 4, 2006, 2:34 PM |
| USPS | Mail Carrier | Jane Smith (321...) | Jan 4, 2006, 11:42 AM |
| Triangle Messenger | Courier | John Smith (500...) | Jan 6, 2006, 2:03 PM |
| ... | ... | ... | ... |

Close

METHODS AND SYSTEMS FOR PROVIDING ADDRESS TRANSPARENCY

BACKGROUND

1. Field of the Invention

The present invention relates generally to the delivery of mail and packages and, more specifically, to the preservation of a receiving party's privacy in relation to a sending party.

2. Related Art

Modern postal systems use various addressing schemes to specify delivery destinations for mail, packages, and other articles dispatched from sending parties to receiving parties. For example, in the United States, destination addresses typically include separate fields identifying a receiving party's name, street number, street name, city, state, and ZIP+4 code. This format allows public and private delivery agents to readily determine physical delivery locations with ease.

In most cases, the delivery address identified in conventional postal addressing schemes corresponds to the actual physical address of a receiving party's place of business or residence. This can be problematic in several respects. In particular, the unauthorized disclosure of a receiving party's physical address can result in a loss of privacy for the receiving party. For example, it is common practice for newspaper and magazine publishers to offer subscriber lists for sale to direct mail marketers and advertisers. As a result, a receiving party's physical address may be provided to other entities not originally contemplated by the receiving party. Moreover, even where publishers may permit the receiving party to "opt-out" of such information sharing, it is typically incumbent on the receiving party to individually contact every publisher in order to utilize such options.

A receiving party's physical address may also be used as a proxy for determining the receiving party's social and economic status. For example, it is well known that addresses corresponding to particular communities are often associated with wealth or social status. In this regard, disclosure of the receiving party's physical address can inadvertently provide other persons with sufficient information to visit the receiving party's home or business for nefarious purposes, or engage in identity theft.

Another problem applicable to current addressing schemes arises when a receiving party's physical address changes temporarily or permanently. When the receiving party relocates to a new physical address, notifications must be provided to all potential sending parties from which the receiving party routinely, and even rarely, receives mail. If the number of sending parties is particularly large, this can be an overwhelmingly difficult, and sometimes impossible task. Moreover, even when sending parties are informed of the new address, propagation delays may result in some mail being lost or mis-delivered.

One approach to the various problems above involves the use of conventional post office boxes. Post office boxes are typically located at physical locations removed from a receiving party's physical address and therefore can prevent sending parties from visiting the receiving party's business or residence. Post office boxes also typically require keyed access and therefore provide some measure of security. In addition, if the receiving party's physical address changes, mail can be sent to the post office box without interruption.

Unfortunately, post office boxes still require the receiving party to travel to the actual location of the post office box in order to retrieve mail. Also, many private delivery agents may not provide delivery service to post office boxes. Moreover, if a receiving party's physical address changes to a location far away from the post office box, it may be necessary for the receiving party to obtain a new post office box and have all mail redirected to the new box. Such inconveniences can outweigh the privacy advantages of post office boxes for many individuals.

Another approach to handling address changes is the use of forwarding services provided by postal services, such as the United States Postal Service (USPS). However, such services are typically temporary in nature and can have varying degrees of reliability. Such forwarding services also typically do not inform sending parties of the receiving party's actual new address. As a result, the burden remains on the receiving party to inform all sending parties of the new address before the forwarding service expires.

In view of the foregoing, there is a need for an improved approach to addressing schemes that overcome the limitations of conventional systems identified above.

SUMMARY

In accordance with one embodiment of the present invention, a method of managing a delivery includes: selecting a virtual address; registering a first mapping from the virtual address to a first physical address; providing the virtual address to a sending party; and receiving an article at a location corresponding to the first physical address, wherein the article is routed from the sending party to the first physical address using the virtual address.

In accordance with another embodiment of the present invention, a method of routing a delivery includes: receiving an article bearing a virtual address; submitting the virtual address to a service provider; receiving from the service provider a physical address associated with the virtual address; and dispatching the article to a location corresponding to the physical address.

In accordance with another embodiment of the present invention, a method of processing address information includes: storing a plurality of virtual addresses, a plurality of physical addresses associated with the virtual addresses, and a plurality of permissions; receiving a request from a first party to receive one of the physical addresses associated with one of the virtual addresses; comparing the first party with the permissions; and providing the one of the physical addresses to the first party if the first party is authorized by the permissions to receive the one of the physical addresses.

In accordance with another embodiment of the present invention, a delivery system includes: a plurality of virtual addresses; a plurality of physical addresses associated with the virtual addresses; a plurality of permissions; and application software running on a computer, wherein the application software is adapted to perform a method of processing address information, the method comprising: receiving a request from a first party to receive one of the physical addresses associated with one of the virtual addresses, comparing the first party with the permissions, and providing the one of the physical addresses to the first party if the first party is authorized by the permissions to receive the one of the physical addresses.

These and other features and advantages of the present invention will be more readily apparent from the detailed description of the embodiments set forth below taken in conjunction with the accompanying drawings.

BRIEF DESCRIPTION OF THE FIGURES

FIG. 4 illustrates an interface to configure virtual address mapping in accordance with an embodiment of the present invention.

FIG. 5 illustrates an interface to configure a temporary forwarding path in accordance with an embodiment of the present invention.

FIG. 6 illustrates an interface to configure permissions in accordance with an embodiment of the present invention.

FIG. 7 illustrates an interface providing audit trail information in accordance with an embodiment of the present invention.

Like element numbers in different figures represent the same or similar elements.

DETAILED DESCRIPTION

Figure 1:
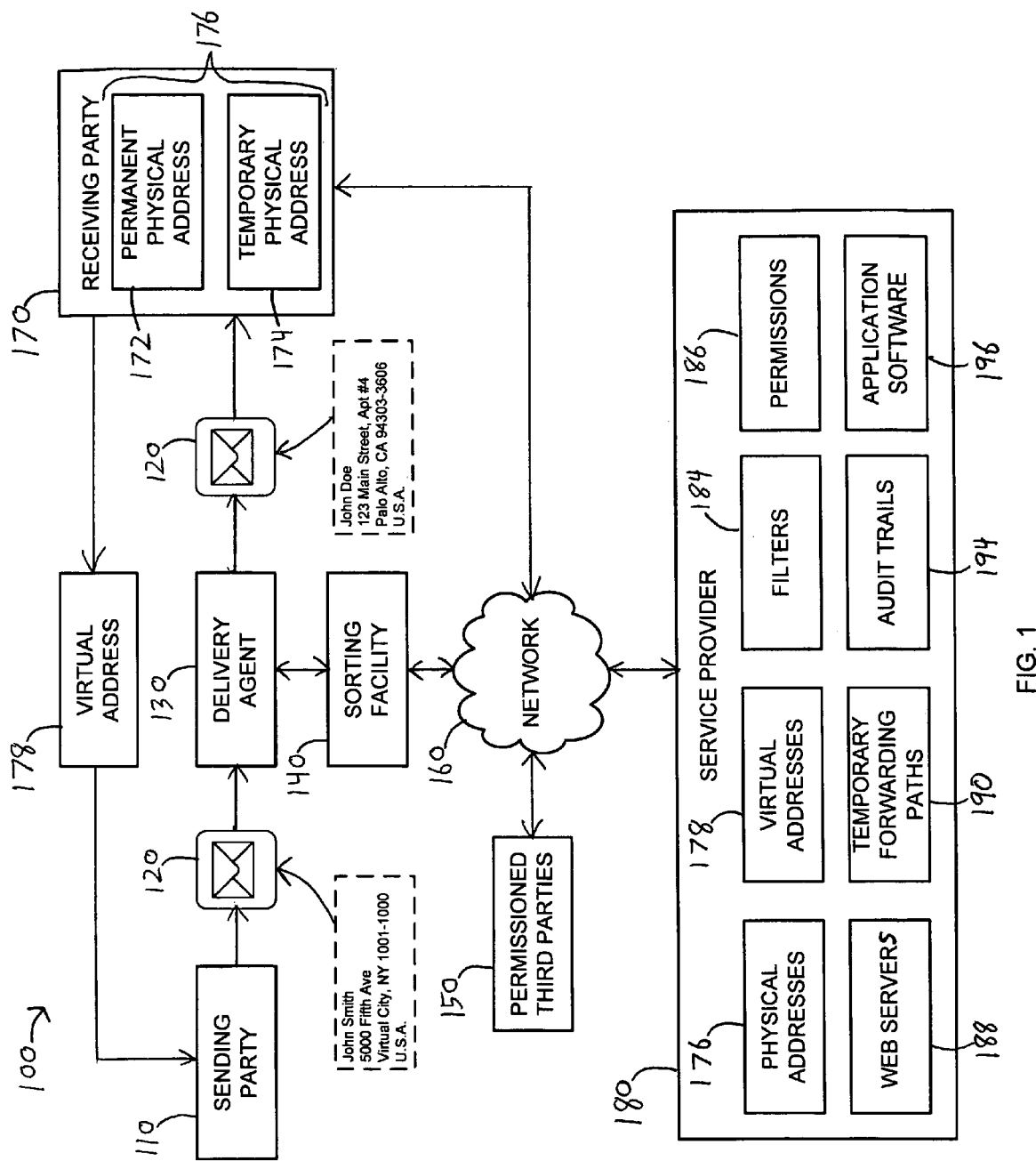
FIG. 1 provides a block diagram of a delivery system utilizing virtual addresses in accordance with an embodiment of the present invention.

Referring now to the drawings wherein the showings are for purposes of illustrating embodiments of the present invention only, and not for purposes of limiting the same, FIG. 1 provides a conceptual block diagram of a delivery system 100 in accordance with an embodiment of the present invention. As will be further described herein, system 100 can be operated to facilitate delivery services between a sending party 110 and a receiving party 170 while permitting the physical location of the receiving party 170 to remain transparent to the sending party 110. For example, system 100 can permit the receiving party 170 to take delivery of mail, packages, or other articles without requiring the receiving party 170 to disclose its physical address to the sending party 110.

Sending party 110 may be any person or entity that desires to send an article 120 to receiving party 170. Similarly, receiving party 170 may be any person or entity intended by sending party 110 to receive article 120. Receiving party 170 has a permanent physical address 172 which may correspond to a residence or business address. Receiving party 170 may also have a temporary physical address 174 which may be used by receiving party 170 on a short-term basis, such as a vacation address.

Article 120 may be any type of mail, package, or other item which sending party 110 desires to be delivered to receiving party 170 through a delivery agent 130. Delivery agent 130 may be any public or private delivery service engaged in the transport or delivery of article 120. For example, in various embodiments, delivery agent 130 may be the United States Postal Service (USPS), United Parcel Service (UPS), Federal Express (FedEx), and/or other public or private delivery service.

As illustrated, receiving party 170 can provide a virtual address 178 to sending party 110 for purposes of delivering article 120 to receiving party 170. The virtual address 178 may be a fictitious address that is selected by receiving party 170 and is mapped to the permanent physical address 172 or temporary physical address 174 (collectively referred to herein as a "physical address 176") of the receiving party 170. For example, in one embodiment, receiving party 170 may select a virtual address 178 that is reflective of the party's personality, personal characteristics, hobbies, or other personal preferences, but not necessarily a physical location. The sending party 110 may affix the virtual address 178 to article 120. For example, in the embodiment of FIG. 1, the virtual address 178 affixed by sending party 110 is illustrated as containing the following text: "John Smith, 5000 Fifth Ave, Virtual City, NY 1001-1000, U.S.A."

The virtual address 178 is stored by a service provider 180 where it may be associated with (i.e., mapped to) the receiving party's physical address 176 which is also stored by the service provider 180. A delivery agent 130 in possession of the article 120 bearing the virtual address 178 may request the associated physical address 176 directly from the service provider 180 and/or through a sorting facility 140. The physical address 176 received back from the service provider 180 may be affixed to the article 120 by delivery agent 130 or sorting facility 140 in order to facilitate delivery of the article 120 to the physical address 176. For example, in the embodiment of FIG. 1, the physical address 176 affixed to article 120 is illustrated as containing the following text: "John Doe, 123 Main Street, Apt #4, Palo Alto, Calif., 94303-3606, U.S.A." which may correspond to the permanent physical address 172 or temporary physical address 174 of the receiving party 170.

FIG. 1 further illustrates a network 160 which may be implemented as one or more landline networks, wireless networks, intranets, portions of the Internet, and/or other network technologies known in the art to facilitate electronic communication between sorting facility 140, a plurality of third parties 150, receiving party 170, and service provider 180.

Sorting facility 140 may be any physical location or entity authorized to interface with service provider 180 on behalf of delivery agent 130. For example, in one embodiment, sorting facility 140 may be a location under the control of delivery agent 130. In another embodiment, sorting facility 140 may be an entity contracted with delivery agent 130 to request physical addresses from service provider 180 on behalf of delivery agent 130. In various embodiments, a plurality of sorting facilities 140 may be distributed across a variety of geographic regions. In this regard, a given sorting facility 140 may be located in close proximity to sending party 110, while another sorting facility 140 may be located in close proximity to a physical address 176 of receiving party 170.

Third parties 150 may be one or more entities authorized by law or by receiving party 170 to receive address information from service provider 180, as further described herein. For example, in various embodiments, third parties 150 may include law enforcement entities, government entities, other delivery agents, and/or other entities.

Service provider 180 is an entity capable of providing virtual address services in accordance with various embodiments of the present invention. In this regard, service provider 180 can maintain various data structures, servers, and applications including physical addresses 176, virtual addresses 178, filters 184, permissions 186, web servers 188, temporary forwarding paths 190, audit trails 194, and application software 196. The various illustrated components of service provider 180 may be implemented through one or more distributed or centralized databases, general purpose computing devices, application-specific computing devices, and/or other computing devices adapted to support various features further described herein.

It will be appreciated that although the various components maintained by service provider 180 are illustrated as discrete components, they may be combined or further separated into subcomponents as may be desired in particular applications. For example, in one embodiment, various data structures may be combined or separated into one or more distributed databases. It will also be appreciated that one or more components of service provider 180 may be provided locally at a location of delivery agent 130 or sorting facility 140.

Turning now to the specific components maintained by service provider 180, a plurality of physical addresses 176 and virtual addresses 178 may be stored by service provider 180. Virtual addresses 178 may be formatted in accordance with various unique addressing schemes as further described herein in relation to FIGS. 2A-D. As also previously described, each of virtual addresses 178 may be associated with one or more physical addresses 176 of receiving party 170.

Filters 184 identify particular sending parties 110 from whom receiving party 170 does not wish to accept deliveries. In this regard, receiving party 170 may "blacklist" particular sending parties 110 to effectively filter out any articles 120 sent by such parties. Additional filters 184 may identify particular classes of articles 120 (for example, advertisements) that receiving party 170 does not wish to receive.

Permissions 186 identify particular delivery agents 130 or other third parties 150 which recipient has identified as being permitted to receive its physical address 176 from service provider 180, as further described herein. Web servers 188 include one or more conventional web servers that may be used to facilitate online interaction between service provider 180 and sorting facility 140, third parties 150, and receiving party 170 over network 160.

Temporary forwarding paths 190 identify mappings between virtual addresses 178 and particular physical addresses 176 which may be designated by receiving party 170 for limited time periods. For example, in the event that receiving party 170 relocates to a temporary physical address 174 (e.g., while on vacation), deliveries may be made to a temporary address 174 specified by a temporary forwarding path 190 instead of a permanent physical address 172.

Audit trails 192 provide a log of any queries received by service provider 180 from delivery agent 130, sorting facility 140, and third parties 150 to look up the physical address 176 associated with a given virtual address 178. As further described herein, receiving party 170 may review the audit trails 194 to identify recent requests for its physical address information. Application software 196 operates on the various other components of service provider 180 to implement the virtual addressing services of service provider 180 described herein.

It will be appreciated that the particular embodiment of system 100 illustrated in FIG. 1 is provided for purposes of example, and that additional embodiments are contemplated. For example, although only one sending party 110, one delivery agent 130, one sorting facility 140, one receiving party 170, and one service provider 180 are illustrated, it will be appreciated that system 100 can be implemented to support a plurality of any of these entities.

FIGS. 2A-D illustrate a plurality of sample virtual address configurations which may be used to format virtual addresses 178 provided by receiving party 170 and stored by service provider 180 in accordance with various embodiments of the present invention. It will be appreciated that the particular virtual address configurations of FIGS. 2A-D are provided for purposes of example only, and that other configurations are also contemplated by the present disclosure.

Figure 2A:
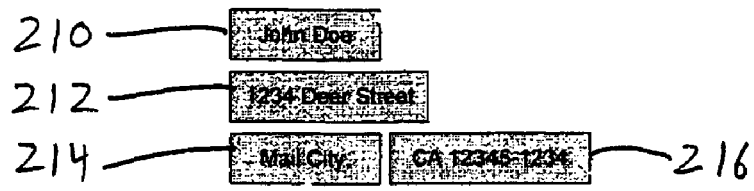
FIGS. 2A-D illustrate a plurality of alternate virtual address configurations in accordance with various embodiments of the present invention.

In the configuration of FIG. 2A, a sample virtual address is shown comprising a name field 210, a street address field 212, a city field 214, and a state/ZIP+4 code field 216. Name field 210 may be a fictitious name selected by the receiving party 170. Street address field 212 may be a fictitious street address selected by the receiving party 170 to resemble a street address in accordance with street numbering and street naming conventions used in the United States.

City field 214 may identify a fictitious city name that identifies the address of FIG. 2A as a virtual address. For example, in the embodiment of FIG. 2A, the city field 214 is designated as "Mail City" which may be commonly used in the various virtual addresses 178 maintained by service provider 180. In another embodiment, the city field 214 may correspond to the name of service provider 180. State/ZIP+4 code field 216 corresponds to the state and ZIP+4 code of the nearest sorting facility 140 in proximity to sending party 110. In this regard, state/ZIP+4 code field 216 may be provided by sending party 110 to correspond to a post office box maintained by the closest sorting facility 140 in proximity to the sending party's 110 location. Additional embodiments of the addressing scheme of FIG. 2A are also contemplated which may use a unique fictitious country name or ZIP+4 code to identify the address as a virtual address.

Figure 2B:
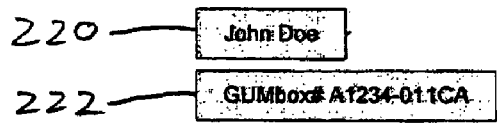

FIG. 2B illustrates another sample virtual address comprising a name field 220 and a mailbox field 222. Similar to FIG. 2A, name field 220 may be a fictitious name selected by the receiving party 170. Mailbox field 222 may specify a unique mailbox associated with the recipient. For example, in the embodiment of FIG. 2B, mailbox field 222 may identify a 10-character mailbox identifier comprised of letters and numbers. It will be appreciated that such a configuration would allow up to $36^{10}$ unique mailbox identifiers. The prefix "GUMbox#" in the embodiment of FIG. 2B identifies the address as corresponding to a global unique mailbox number (GUM#).

Figure 2C:
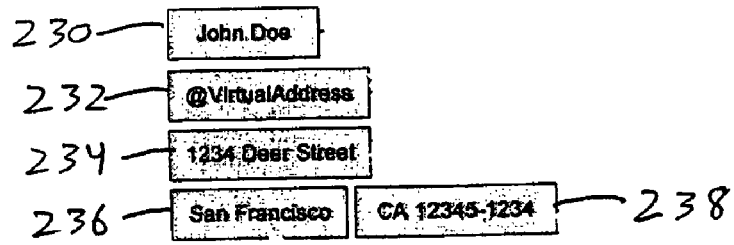

FIG. 2C illustrates another sample virtual address comprising a name field 230, a tag field 232, a street address field 234, a city field 236, and a state/ZIP+4 code field 238. It will be appreciated that name field 230, street address field 234, and state/ZIP+4 code field 238 of FIG. 2C may be implemented as previously described with respect to fields 210, 212, and 216 of FIG. 2A, respectively. In addition, tag field 232 of FIG. 2C can be used to identify the address of FIG. 2C as a virtual address which may be commonly used in virtual addresses 178 maintained by service provider 180. City field 236 may be used in conjunction with state/ZIP+4 code field 238 to further identify the location of the nearest sorting facility 140 in proximity to sending party 110. Alternatively, city field 236 may be used in conjunction with tag field 232 to identify the address as a virtual address.

Figure 2D:
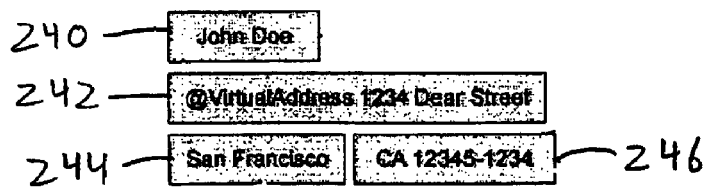

FIG. 2D illustrates a modified version of the virtual address of FIG. 2C in which a tag field and a street address field have been combined into a single a tag/street address field 242. It will be appreciated that FIG. 2D also includes a name field 240, city field 244, and state/ZIP+4 code field 226 which may be implemented as previously described with respect to fields 230, 236, and 238 of FIG. 2C, respectively.

Figure 3A:
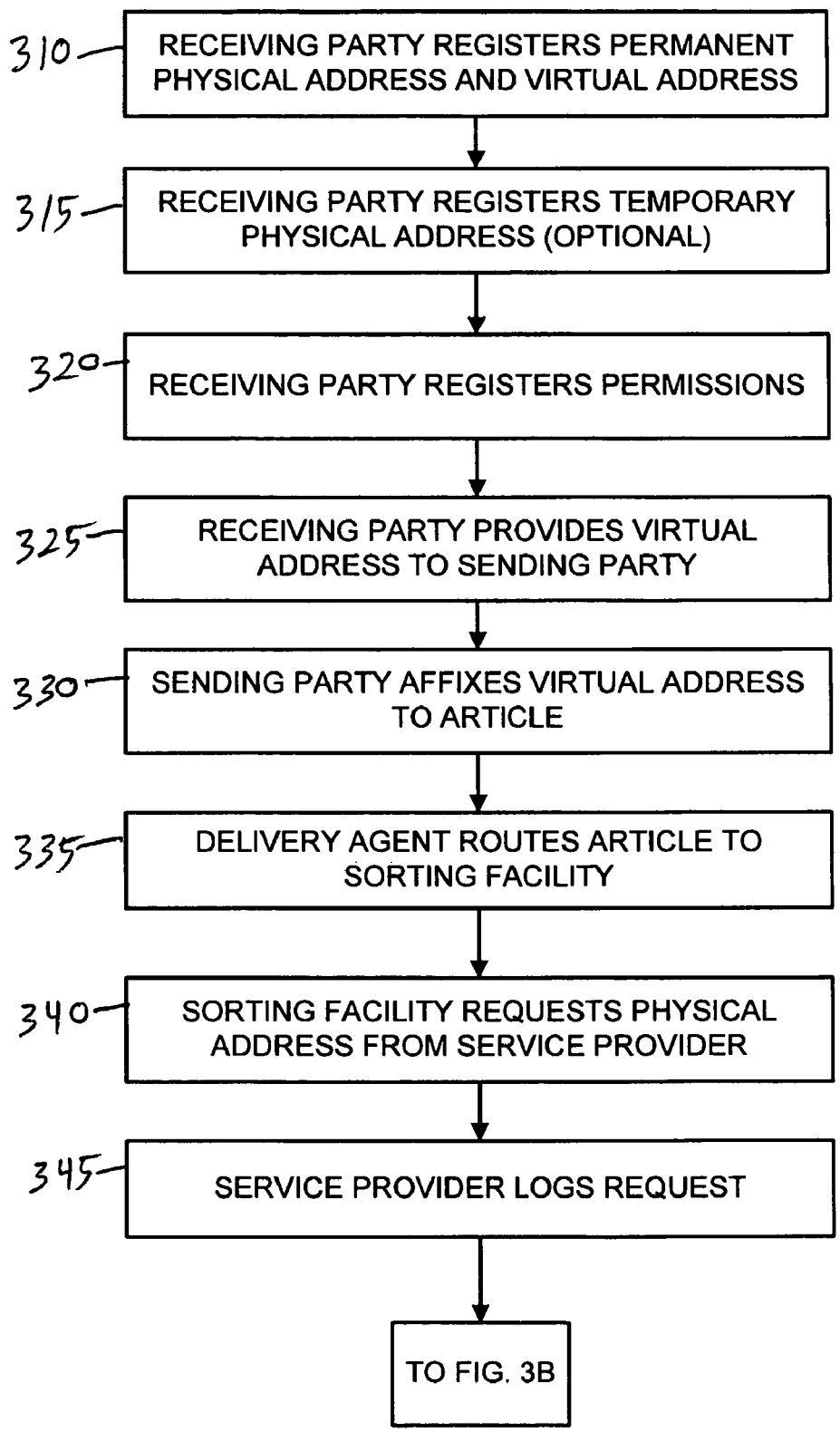
FIGS. 3A-B provide a flowchart illustrating a process of delivering an article from sending party to a receiving party using a virtual address in accordance with an embodiment of the present invention.
Figure 3B:
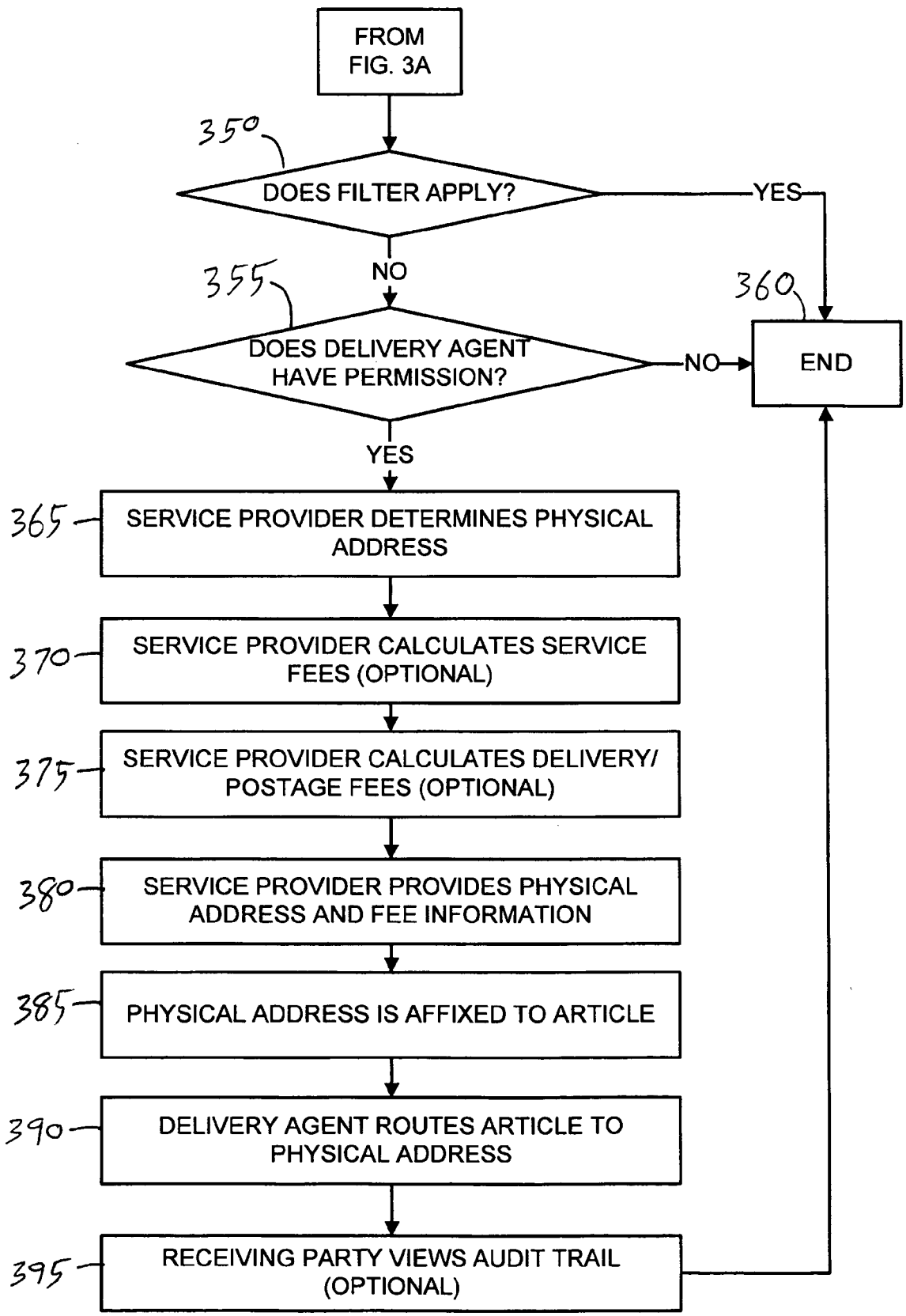

FIGS. 3A-B provide a flowchart illustrating a process of delivering an article 120 from sending party 110 to receiving party 170 using a virtual address 178 in accordance with an embodiment of the present invention. At initial steps 310, 315, and 320, receiving party 170 interacts with service provider 180 to configure the virtual address servicing features offered by service provider 180. In one embodiment, such interaction can be performed by receiving party 170 accessing web servers 188 of service provider 180 over network 160. It will be appreciated that initial steps 310, 315, and 320 need not be performed for subsequent interactions between receiving party 170 and sending party 110, or other parties. For example, it is contemplated that after the virtual address servicing features offered by service provider 180 have been configured, the process of FIGS. 3A-B may be repeated beginning at step 325 for additional articles 120.

In step 310, receiving party 170 registers a virtual address 178 and an associated permanent physical address 172 with service provider 180. FIG. 4 illustrates a sample user interface 400 which may be provided by web servers 188 in step 310. User interface 400 includes a first set of fields into which receiving party 170 may enter a desired virtual address 178 to be stored by service provider 180. It will be appreciated that the virtual address 178 may be entered in accordance with any virtual address configuration accepted by service provider 180, such as the configurations illustrated in FIGS. 2A-D.

As shown in FIG. 4, receiving party 170 has entered a fictitious name ("John Smith"), fictitious street address ("5000 Fifth Ave"), a state ("NY"), and a ZIP+4 code ("10001-1000") for virtual address 178. A predetermined fictitious city ("Virtual City") is provided by service provider 180 which identifies the address as a virtual address. A predetermined country ("U.S.A.") is also provided by service provider 180. Application software 196 of service provider 180 may compare the virtual address entered by receiving party 170 with previously stored virtual addresses 178 and prompt the receiving party 170 to select another virtual address if necessary.

User interface 400 also includes a second set of fields into which receiving party 170 may enter its permanent physical address 172 to be stored by service provider 180 with other physical addresses 176. As shown in FIG. 4, receiving party 170 has entered a name ("John Doe"), street address ("123 Main Street, Apt #4"), city ("Palo Alto"), state ("CA"), ZIP+4 code ("94303-3606"), and country ("U.S.A.") for permanent physical address 172.

After receiving party 170 has entered a virtual address 178 and a permanent physical address 172, the receiving party 170 can then register the addresses with service provider 180 by selecting icon 402 which will instruct service provider 180 to store the entered information. As illustrated, user interface 400 also includes instructions 404 for the convenience of receiving party 170.

Turning again to FIG. 3A, at optional step 315, receiving party 170 interacts with service provider 180 to register a temporary physical address 174 with service provider 180, if desired. FIG. 5 illustrates a sample user interface 500 which may be provided by web servers 188 in step 315. User interface 500 includes a first set of fields which display the virtual address 178 of receiving party 170 previously registered in step 310. User interface 500 also includes a second set of fields into which receiving party 170 may enter a temporary physical address 174 as well as applicable start and stop dates 502 for mail forwarding to define a temporary forwarding path 190 for routing articles 120 from the virtual address 178 to the temporary physical address 174. As illustrated in FIG. 5, temporary forwarding path 190 can further specify that any undelivered articles 120 be routed back to the receiving party's 170 permanent physical address 172 previously registered in step 310.

In the embodiment shown in FIG. 5, receiving party 170 has entered a name ("John Doe"), street address ("456 Oak Street"), city ("Los Angeles"), state ("CA"), ZIP+4 code ("92000-1111"), and country ("U.S.A.") for temporary physical address 174. Receiving party 170 has also entered start and stop dates 502 of "Jan. 15, 2006" and "Feb. 15, 2006," respectively.

After receiving party 170 has entered a temporary physical address 174 and start/stop dates 502, the receiving party 170 can then register the information with service provider 180 by selecting icon 504 which will instruct service provider 180 to store the entered information as temporary forwarding path 190. As illustrated, user interface 500 also includes instructions 506 for the convenience of receiving party 170.

Returning to FIG. 3A, at step 320, receiving party 170 interacts with service provider 180 to register permissions 186. FIG. 6 illustrates an interface 600 which may be provided by web servers 188 in step 320. User interface 600 includes a list of delivery agents 130 and third parties 150 that may be specified by receiving party 170 to have permission to look up an applicable physical address 176 of receiving party 170 using a virtual address 178. Each entity listed in FIG. 6 has an associated permission 186 ("Allow" or "Deny") which may be specified by receiving party 170. It will be appreciated that in certain embodiments, receiving party 170 may not be permitted to deny access by particular third parties (for example, law enforcement). After receiving party 170 has specified permissions 186 for the various listed entities, the receiving party 170 can register permissions 186 with service provider 180 by selecting icon 602.

Turning again to FIG. 3A, at step 325, receiving party 170 provides its virtual address 178 to sending party 110. In response, sending party 110 affixes the virtual address 178 to article 120 (step 330). For billing purposes, sending party 110 may optionally affix an account number (for example, in the form of a barcode in encrypted form using a one-time encryption key) to article 120 as well. Article 120 is provided to delivery agent 130 who then routes the article 120 (step 335) to sorting facility 140. It will be appreciated that in order to facilitate expedient routing of article 120, virtual address 178 may identify a state and ZIP+4 code field corresponding to the nearest sorting facility 140 in proximity to sending party 110 as previously described. In such an embodiment, article 120 need not be routed to a sorting facility 140 remote to sending party 110. It will be appreciated that such optimized routing of article 120 may advantageously minimize delivery costs.

At step 340, sorting facility 140 forwards the virtual address 178 affixed to article 120 to service provider 180 as part of a query to request the physical address 176 mapped to the virtual address 178. The query of step 340 may also include information identifying the identities of the sending party 110 and the delivery agent 130, as well as the type of article 120 (for example, advertising). The query is logged by service provider 180 and maintained in an audit trail 194 (step 345).

Referring now to FIG. 3B, service provider 180 compares the identity of the sending party 110 and the type of article 120 with filters 184 to determine if receiving party 170 has elected to block deliveries from sending party 110 (step 350). If an applicable filter 184 is found (for example, if the particular sending party 110 or type of article 120 is identified as undesirable by receiving party 170), then the process of FIGS. 3A-B ends (step 360). Otherwise, the process continues to step 355.

At step 355, service provider 180 compares the identity of the delivery agent 130 with permissions 186 previously specified by receiving party 170 in step 320. If delivery agent 130 is not authorized to view the physical address 176 of receiving party 170, then the process of FIGS. 3A-B ends (step 360). However, if the delivery agent 130 is authorized to view the physical address 172, then service provider 180 determines the physical address 176 associated with the virtual address 178 (step 365). In this regard, the physical address 176 determined in step 365 may be a permanent physical address 172 or a temporary physical address 174 (if a temporary forwarding path 190 registered in step 315 is currently active) mapped to virtual address 178.

In optional step 370, application software 196 of service provider 180 may calculate one or more service fees to be charged to one or more of sending party 110, delivery agent 130, sorting facility 140, third parties 150, receiving party 170, or another responsible party in order to compensate service provider 180 for its virtual addressing services. Such fees may be implemented in accordance with one or more appropriate revenue models. For example, such fees may be assessed on a periodic basis, a per-lookup basis (i.e., in step 370 of FIG. 3B), on a mail volume basis, or in accordance with other billing methods known in the art. It is also contemplated that individual parties, such as delivery agents 130, could receive payments from service provider 180 as an incentive to utilize its services.

In optional step 375, application software 196 of service provider 180 may calculate applicable delivery fees or postage fees associated with the routing of article 120 from the location of sending party 110 to physical address 176. In this regard, it will be appreciated that because sending party 110 is not apprised of the actual final destination of article 120 (i.e., the applicable physical address 176 of receiving party 170), it may not be possible for sending party 110 to ascertain the appropriate delivery/postage fees associated with article 120. Accordingly, service provider 180 may calculate such fees in step 375 to be charged to one or more of sending party 110, delivery agent 130, sorting facility 140, third parties 150, receiving party 170, service provider 180, or another responsible party as part of, or in addition to, the service fees determined in previous step 370. In an alternate embodiment, sending party 110 may bear the fees associated with delivering article 110 to sorting facility 140 and receiving party 170 may bear the fees associated with the remainder of the delivery.

In step 380, service provider 180 returns the physical address 176 determined in step 365 to sorting facility 140 along with any applicable fee information determined in steps 370 and/or 375. Applicable fees (for example, service fees and/or delivery/postage fees) may be subsequently billed to an account of any appropriate party illustrated in FIG. 1. In one embodiment, an account number of sending party 110 affixed to article 120 (for example, in the form of a barcode or otherwise) may be provided to service provider 180 as part of the request received in step 340. In this regard, any fees to be charged to sending party 110 may be conveniently charged to the account number.

In step 385, sorting facility 140 affixes the physical address 176 returned by service provider 180 to article 120. In various embodiments, the physical address 176 may be affixed to article 120 in human-readable or machine-readable form. For example, in one embodiment, the physical address 176 may be provided on a human-readable sticker or similar label that obscures or obliterates the previously-affixed virtual address 178. In another embodiment, the physical address 176 may be affixed in the form of a machine-readable coded or encrypted barcode (for example, an extension of USPS Delivery Point Barcode implementations, a PDF-417 barcode, a Data Matrix barcode, a United Parcel Service Maxicode barcode, or others). It will be appreciated that affixing the physical address 176 in machine-readable form can provide increased privacy to receiving party 170 by reducing the likelihood of an unauthorized party being able to readily ascertain the physical address 176 in the event that article 120 is lost or stolen. Delivery agent 130 then routes article 120 to the physical address 176 to complete the delivery (step 390).

At optional step 395, receiving party 170 may choose to view the audit trail 194 maintained by service provider 180. FIG. 7 illustrates a sample user interface 700 which may be provided by web servers 188 in step 385. In the example of FIG. 7, receiving party 170 can view the name 702 and type 704 of each entity that has requested one or more physical addresses 176 of recipient. As illustrated, audit trail 194 may further identify the virtual address 178 specified in each request as well as the time 706 at which the request was logged. Following step 395, the process of FIGS. 3A-B ends (step 360).

It will be appreciated that the preceding description of the process of FIGS. 3A-B has been provided for purposes of example. Various aspects of the process may be modified in accordance with additional embodiments of the present invention. For example, it is contemplated that system 100 may be optionally extended to support other features in addition to those described above in relation to the process of FIGS. 3A-B.

In one embodiment, system 100 may be extended to support the lookup of previous physical addresses, virtual addresses, telephone numbers, instant messenger identities, and/or other personal information of the receiving party 170. For example, service provider 180 may store previous physical addresses or previous virtual addresses of receiving party 170 which may be mapped to one or more current virtual addresses 178 or physical addresses 176. In this regard, sending party 110 or third parties 150 may be permitted to look up previous addresses of receiving party 170 to determine the current virtual address 178 of the receiving party 170. It will be appreciated that such features may facilitate the receiving party's 170 transitioning to the use of a virtual address 178. If receiving party 170 has recently moved from a previous physical address to a new physical address 176, a sending party 110 seeking to send articles 120 to the new physical address 176 may be permitted to look up the receiving party's 170 virtual address 178 using the previous address. Because the virtual address 178 is associated with the new physical address 176, articles 120 sent to the virtual address 178 may be delivered to the new physical address 176 without revealing the physical address 176 to the sending party 110.

In another embodiment, system 100 may be extended to provide validation services for virtual addresses 178. For example, sending party 110, delivery agent 130, third parties 150, receiving party 170, or other parties external to service provider 180 could be permitted to query service provider 180 to determine whether a given virtual address 178 has already been registered with service provider 180 and corresponds to a valid physical address 176.

In yet another embodiment, system 100 may be extended to facilitate rules-based delivery services. In such an embodiment, receiving party 170 or service provider 180 may maintain a set of rules which provide a conditional mapping between virtual addresses 178 and physical addresses 176. For example, receiving parties 170 that experience a large number of deliveries may often maintain a plurality of physical addresses 176 corresponding to different types of delivered articles 120. In such applications, service provider 180 may map various articles 120 to particular physical addresses 176 based on particular return merchandise authorization (RMA) numbers provided on each article 120. It is contemplated that service provider 180 could be provided access to a database maintained by receiving party 170 through appropriate web services in order to further facilitate the implementation of such services.

In still another embodiment, system 100 may be extended to permit receiving party 170 to utilize a plurality of virtual addresses 178 including "disposable" virtual addresses 178 which remain active for only a limited number of transactions. As a result, the receiving party 170 may further limit the availability of its personal information.

In view of the foregoing, it will be appreciated that methods and systems implemented in accordance with various embodiments described herein may be applied in a variety of ways to improve upon prior delivery approaches. As discussed, the use of virtual addresses in the manner described herein can allow a receiving party 170 to maintain the privacy of its permanent physical address 172 and temporary physical address 174 when interacting with a sending party 110. In addition, articles 120 can be conveniently re-routed to a receiving party's 170 new physical address 176 by conveniently updating the mapping of the receiving party's 170 virtual address 178 to a new physical address 176.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in accordance with the principles set forth herein. Accordingly, the scope of the invention is defined only by the claims.

What is claimed is:

1. A delivery system for facilitating delivery of a physical article from a sending party to a receiving party while using a virtual address to preserve privacy of one or more physical addresses of the receiving party in relation to the sending party, the system comprising:
a non-transitory computer readable medium storing:
a plurality of virtual addresses, wherein the virtual addresses are fictitious addresses encoded as conventional delivery addresses,
a plurality of physical addresses associated with the virtual addresses, wherein the physical addresses correspond to geographic locations capable of receiving deliveries of physical articles, and
a plurality of permissions; and
a service provider server running application software to perform a method of processing address information, the method comprising:
receiving a request from a first party to receive one of the physical addresses associated with one of the virtual addresses provided from the receiving party to the sending party for delivery of the physical article to the receiving party,
comparing the first party with the permissions, and
if the first party is authorized by the permissions to receive the one of the physical addresses, providing the one of the physical addresses for delivery of the physical article to the one of the physical addresses without identifying the one of the physical addresses to the sending party, wherein the physical article is a package or envelope for delivery by a physical delivery system to the geographic locations.

2. The system of claim 1, wherein the method further comprises:
registering at the service provider server a first mapping from the one of the virtual addresses to the one of the physical addresses.

3. The system of claim 2, wherein the one of the physical addresses is a permanent physical address of the receiving party.

4. The system of claim 2, wherein the one of the physical addresses is a temporary physical address of the receiving party.

5. The system of claim 2, wherein the method further comprises receiving a set of rules to determine the first mapping.

6. The system of claim 2, wherein the method further comprises registering a second mapping from the one of the virtual addresses to a second physical address.

7. The system of claim 6, wherein the second mapping identifies a temporary forwarding path.

8. The system of claim 2, wherein the method further comprises providing a query of the first party to receive the first physical address.

9. The system of claim 8, wherein the first party is a delivery agent.

10. The system of claim 2, wherein the conventional delivery address of the one of the virtual addresses is encoded as a fictitious mailing address.

11. The system of claim 2, wherein the one of the virtual addresses identifies a sorting facility in proximity to the sending party.

12. The system of claim 2, wherein the one of the virtual addresses comprises a tag to identify the one of the virtual addresses.

13. The system of claim 12, wherein the tag is selected from the group consisting of: a fictitious city identifier, a mailbox identifier, an address line, and a ZIP+4 code.

14. The system of claim 1, wherein the physical delivery system is adapted to affix the one of the physical addresses to the physical article.

15. The system of claim 1, wherein the physical deliver system is adapted to affix the one of the physical addresses to the physical article in a human-readable form.

16. The system of claim 1, wherein the physical delivery system is adapted to affix the one of the physical addresses to the physical article in a machine-readable form.

17. The system of claim 16, wherein the machine-readable form is a barcode.

18. The system of claim 16, wherein the machine-readable form is encrypted.

19. The system of claim 1, wherein the method further comprises calculating a fee associated with the physical article using the one of the physical addresses.

20. The system of claim 19, wherein the method further comprises charging at least a portion of the fee to at least one party selected from the group consisting of: the sending party, the receiving party, a delivery agent, a sorting facility, and a virtual address service provider.

21. The system of claim 19, wherein the method further comprises comprising charging at least a portion of the fee to an account number associated with the sending party, wherein the account number is identified by the request.

22. The system of claim 21, wherein the account number is provided by the sending party as a barcode.

23. The system of claim 1, wherein the method further comprises logging the request as part of an audit trail.

24. The system of claim 1, wherein the sending party is identified by the request, wherein the method further comprises comparing the sending party identified by the request with a set of sending parties, wherein the one of the physical addresses is unknown to the sending party.

25. The system of claim 1, wherein the method further comprises comparing a physical article type identified by the request with a set of physical article types.

26. The system of claim 1, wherein the method further comprises providing personal information of a second party in response to a request identifying information selected from the group consisting of: a previous physical address, a previous virtual address, a previous telephone number, and a previous instant messenger identity of the second party.

27. The system of claim 1, further comprising at least a first web server adapted to provide a user interface to facilitate configuration of the virtual addresses, physical addresses, and permissions by a second party.

28. The system of claim 1, further comprising a plurality of audit trails.

29. The system of claim 1, further comprising a plurality of filters.

30. The system of claim 1, further comprising a plurality of temporary forwarding paths.

31. The system of claim 1, further comprising a previous virtual address of a second party.

\* \* \* \* \*